Patented Dec. 10, 1929

1,738,669

UNITED STATES PATENT OFFICE

MALCOLM N. RICH, OF EAST ORANGE, NEW JERSEY, ASSIGNOR TO WESTINGHOUSE LAMP COMPANY, A CORPORATION OF PENNSYLVANIA

METHOD OF REDUCING RARE REFRACTORY-METAL OXIDES

No Drawing.   Application filed November 9, 1927.  Serial No. 232,203.

This invention relates to a method of obtaining a metal from its compound and more particularly to the reduction of the oxides of the rare refractory metals such as uranium, thorium and the like.

In the application of Marden et al., Serial No. 618,544, filed February 12, 1923 issued March 5, 1929 as U. S. Patent 1,704,257 is described a method of reducing the rare refractory metal oxides, which method comprises enclosing a mixture of the oxide and calcium and calcium chloride in a closed bomb sealed from the atmosphere and heating the bomb to the reaction temperature. This method has been found very satisfactory and has been extensively employed in the manufacture of thorium, chromium and other rare refractory metals in very pure form.

In practicing the foregoing process it has been customary to prepare the calcium used in the process by first cleaning large sticks of the same by mechanically removing the outer skin, consisting chiefly of calcium chloride, to expose the bright metallic surface of the calcium. These cleaned sticks are then chipped into small sized pieces so that the calcium may be mixed better with the charge. These chips, if not to be used immediately, are stored in stoppered bottles to prevent absorption of moisture, air, carbon dioxide, and other impurities.

Considerable care must be exercised in preventing the calcium chips from becoming contaminated, otherwise such chips if used, introduce detrimental impurities in the final product which have a deleterious effect upon the working properties of the metal. Furthermore, it has been found that with some metals, such as vanadium, tantalum, chromium and the like, that it is very necessary to remove residual air, moisture, nitrogen, carbon, etc., prior to the actual reduction reaction. The present invention provides a simple method whereby it is possible to prevent these deleterious contaminations from being introduced into the metal powder.

Briefly, my process provides a reducing agent which is more stable in the air than calcium and more specifically consists of a calcium-magnesium alloy which may be substituted entirely or in part for the calcium which is employed at the present time in effecting the reduction of the rare refractory metal oxides.

There are three types of calcium-magnesium alloys either of which may be employed in place of calcium. These are (1) magnesium rich alloys, (2) calcium rich alloys, and (3) the calcium-magnesium compound $Ca_3Mg_4$. The addition of calcium to magnesium causes a pronounced embrittling action on the resultant alloy and the addition of magnesium to calcium produces the same effect on the resultant alloy but in addition, affords a means of imparting to the calcium, when present in sufficient amounts, a bright surface which remains untarnished except in moist or warm air. The surface absorption of gases is also much lessened.

In general, it may be stated that a 50-50 mixture (by weight) of these two metals will produce a calcium-magnesium compound $Ca_3Mg_4$ having a melting point of about 725° C. The magnesium rich alloy may contain about 80% of magnesium and 20% of calcium, the melting point thereof being 514° C. The calcium rich alloy may contain about 80% of calcium and 20% of magnesium and has a melting point of about 466° C.

The following method may be employed in preparing the calcium-magnesium alloy ($Ca_3Mg_4$) suitable for use in effecting the reduction of the rare refractory metal oxides. Equal weights of calcium and magnesium may be placed in a steel bomb consisting of a nipple threaded at each end and two threaded caps for closing each end. The steel bomb is then enclosed in a nichrome bomb of similar type used in the usual $Ca.CaCl_2$ reduction methods of producing refractory metals and described in copending application referred to above. The ground and tapered stopper is well fitted as it is necessary to exclude air and moisture from the metals during alloying. The nichrome bomb is thus heated in a nichrome wound furnace to about 800° to 850° C. for a sufficient period of time to effect the alloying. The alloying may be more readily effected by using a small amount of calcium chloride flux or a small amount of a previously fused 50-50 (by weight) mixture of sodium and potassium chlorides. The use of a flux is desirable for the additional reason that it removes impurities which may be present in the magnesium or calcium.

After cooling the fused alloy, being brittle, may be readily chipped out of the bomb and may be comminuted by grinding or ball-milling. The finely ground alloy should then be washed with water and very dilute acid to remove the salts soluble therein and the calcium-magnesium compound remaining which is relatively insoluble in water, may be dried with alcohol and placed in glass stoppered bottles for future use.

The magnesium rich or calcium rich alloys may be made in the same manner as described above except that it is preferable to employ the calcium-magnesium compound $Ca_3Mg_4$ as an additive rather than calcium metal. By doing so, greater diffusibility within the alloy is obtained and in addition, the alloy is cleaner. It is to be understood that in making the calcium rich or magnestium rich alloys the proper percentages of calcium or magnesium will be employed to obtain the desired result.

The $Ca_3Mg_4$ alloy may be employed, as heretofore stated, in place of the calcium now used in the calcium-calcium chloride reduction method described in the above mentioned application, or may be used together with the calcium. The following advantages are secured by employing such an alloy in said process: (1) it will reduce the initial temperature at which reduction is initiated, this being desirable for some metals; (2) the heat energy of the reduction is reduced, thus permitting the use of less calcium chloride in the charge; (3) carbonate, free carbon and nitrogen contamination is reduced; (4) the reducing metal may be employed in a more finely comminuted state, thus enabling more uniform and consistent results to be obtained; (5) it effects a more complete and efficient clean-up of residual gases (air, moisture, nitrogen, $CO_2$ and the like) within the sealed reduction chamber and at a lower temperature than obtained by calcium alone.

The following reduction calculations, using chromium as the resultant metal obtained, indicates the effect obtained on heat energy of the reduction reaction.

(1) Calcium-calcium chloride reduction method:

$$7(Cr_2O_3) + 21Ca + 21CaCl_2 = 14Cr + 21(CaO.CaCl_2)$$
Molecular weights—7(152)+21(40)+21(110).

(2) $Ca_3Mg_4$ reduction method:

$$7(Cr_2O_3) + 3(Ca_3Mg_4) = 14Cr + 9CaO + 12MgO.$$
Molecular weights—7(152)+3(216).

Heat energy of first method equals 6904−3696 = 3208 Cal excess

Heat energy of second method equals 5541−3696 = $\dfrac{1845 \text{ Cal excess}}{1363 \text{ Cal}}$ This represents a loss in heat energy of about 40% but still yields plenty of excess for this reduction action to proceed and permits the use of 50% less calcium chloride in the reduction charge.

While the reduction of chromium oxide has been taken as an example, other refractory metal oxides may be similarly reduced through the use of the $Ca_3Mg_4$ alloy or by using the magnesium rich or calcium rich alloys. I have also found that the addition of 20% to 25% (by weight) of the $Ca_3Mg_4$ compound to the normal calcium-calcium chloride reduction of some refractory oxides facilitates the reduction thereof.

The many advantages of employing a calcium-magnesium alloy have been fully outlined above. It is obvious, however, that modifications may occur to those skilled in this art, but such modifications are contemplated as come within the scope of my invention as defined by the appended claims.

What is claimed is:

1. The method of producing refractory metals which consists in heating in an hermetically sealed container, a metallic oxide, an alkaline earth metal halide and a calcium-magnesium alloy.

2. The method of producing refractory metals which consists in heating in a reducing chamber from which air is substantially excluded, a rare refractory metal oxide, an alkaline earth metal halide and a calcium-magnesium alloy compound.

3. The method of producing rare refractory metals such as uranium, thorium, chromium and the like from their difficulty reducible oxides which comprises heating to reaction temperature a mixture of a rare refractory metal oxide, an alkaline earth halide and a magnesium-calcium alloy, the reduction taking place in an hermetically sealed container.

4. The method of producing rare refractory metals such as uranium, thorium, chromium and the like, from their difficultly reducible oxides which comprises heating to reaction temperature in an hermetically sealed chamber, a mixture of a rare refractory metal oxide, calcium chloride and a magnesium-calcium alloy.

5. The method of producing chromium from its difficultly reducible oxide which comprises heating to reaction temperature a mixture of chromium oxide, calcium chloride and a calcium-magnesium alloy, the same being conducted in an hermetically sealed container.

6. The method of producing rare refractory metal powders which comprises heating in an hermetically sealed container a mixture of metallic oxide, an alkaline earth metal halide, calcium and calcium-magnesium alloy.

7. The method of producing rare refractory metal powders which comprises heating in an hermetically sealed container a mixture comprised of metallic oxide, calcium chloride, calcium and a proportion of a calcium-magnesium alloy compound.

In testimony whereof, I have hereunto subscribed my name this 8th day of Nov., 1297.

MALCOLM N. RICH.